US009279544B1

(12) United States Patent
Dankelmann et al.

(10) Patent No.: US 9,279,544 B1
(45) Date of Patent: Mar. 8, 2016

(54) LED LINEAR LIGHTING STRIP

(71) Applicant: Elemental LED, Inc., Emeryville, CA (US)

(72) Inventors: Andreas Dankelmann, San Francisco, CA (US); Mark D Kelley, Oakland, CA (US)

(73) Assignee: Elemental LED, Inc., Emeryville, CA (US)

( * ) Notice: Subject to any disclaimer, the term of this patent is extended or adjusted under 35 U.S.C. 154(b) by 113 days.

(21) Appl. No.: 14/184,475

(22) Filed: Feb. 19, 2014

(51) Int. Cl.

| | |
|---|---|
| ***F21S 4/00*** | (2006.01) |
| ***F16B 7/00*** | (2006.01) |
| ***F16B 12/36*** | (2006.01) |
| ***F16B 13/00*** | (2006.01) |
| ***F21K 99/00*** | (2010.01) |
| ***F21V 21/005*** | (2006.01) |
| ***F21V 21/04*** | (2006.01) |
| *F21V 21/088* | (2006.01) |

(52) U.S. Cl.
CPC ... *F21K 9/17* (2013.01); *F21K 9/90* (2013.01); *F21S 4/008* (2013.01); *F21V 21/005* (2013.01); *F21V 21/044* (2013.01); *F21V 21/045* (2013.01); *F21V 21/088* (2013.01)

(58) Field of Classification Search
CPC ... F21V 21/005; F21V 21/044; F21V 21/045; F21V 21/088; F21S 4/008; F21K 9/17; F21K 9/175; F21K 9/90
USPC .......................... 248/220.21, 221.11, 222.11; 362/292–298; 403/294, 298
See application file for complete search history.

(56) References Cited

U.S. PATENT DOCUMENTS

| | | | | |
|---|---|---|---|---|
| 4,994,944 | A | 2/1991 | Vernondier | |
| 5,730,544 | A * | 3/1998 | Dils et al. | 403/292 |
| 5,758,987 | A * | 6/1998 | Frame et al. | 403/298 |
| 7,033,060 | B2 | 4/2006 | Dubuc | |
| 7,207,696 | B1 * | 4/2007 | Lin | 362/249.03 |
| 8,287,144 | B2 * | 10/2012 | Pedersen et al. | 362/217.01 |
| 2003/0016992 | A1 * | 1/2003 | Layfield | 403/294 |
| 2003/0021115 | A1 * | 1/2003 | Sloan et al. | 362/240 |
| 2003/0210546 | A1 * | 11/2003 | Chin | 362/249 |
| 2006/0146540 | A1 * | 7/2006 | Reo et al. | 362/332 |
| 2007/0047229 | A1 * | 3/2007 | Lee | 362/237 |
| 2010/0271804 | A1 | 10/2010 | Levine | |
| 2011/0007503 | A1 | 1/2011 | Caron et al. | |
| 2011/0286207 | A1 | 11/2011 | Chan et al. | |
| 2012/0002046 | A1 | 1/2012 | Rapoport et al. | |
| 2013/0094225 | A1 | 4/2013 | Leichner | |

* cited by examiner

*Primary Examiner* — Peggy Neils
*Assistant Examiner* — Alexander Garlen
(74) *Attorney, Agent, or Firm* — PatentBest; Andrew McAleavey

(57) ABSTRACT

An LED lighting kit comprises an extrusion, an LED strip, a tapered wedge, and a mounting clip. The clip is sized and shaped to springably engage ledges in a first channel of the extrusion when the strip is mounted. In one aspect, two extrusions are butted end-to-end and are aligned by inserting the tapered wedge into the first channel of each extrusion prior to butting them together. The extrusion contains a second channel that houses the LED strip. A translucent diffuser is springably inserted into the second channel, thereby diffusing light that is emitted by the LED strip. End caps are inserted into the ends of the extrusion to complete the light kit. At least one of the end caps has a hole to admit electrical wires to power the LED strip.

18 Claims, 3 Drawing Sheets

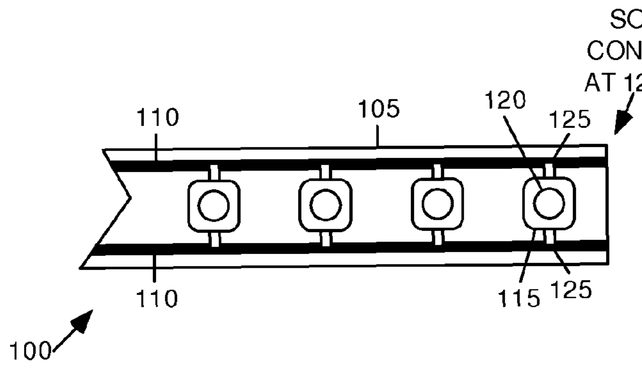
Fig. 1--Prior Art
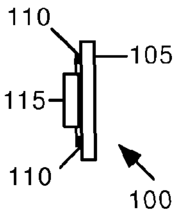
Fig. 2--Prior Art
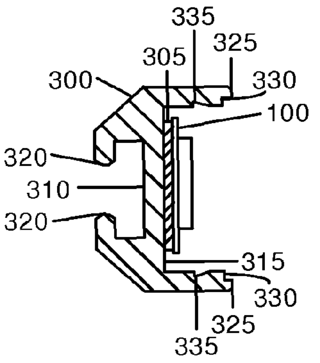
Fig. 3
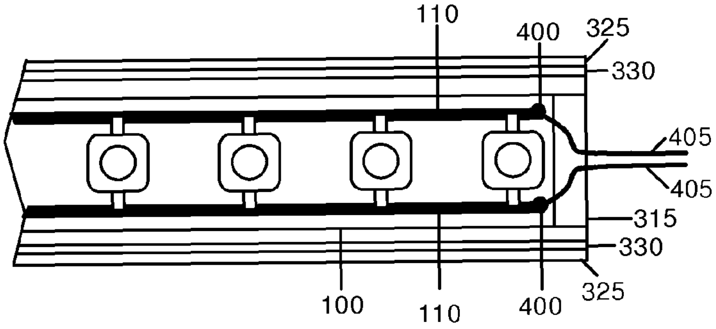
Fig. 4
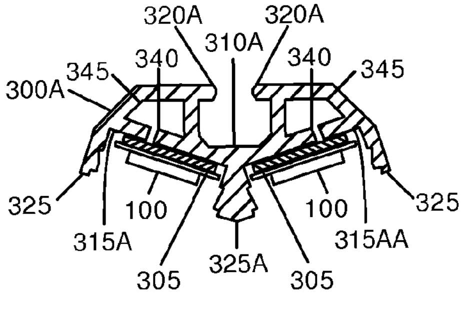
Fig. 5
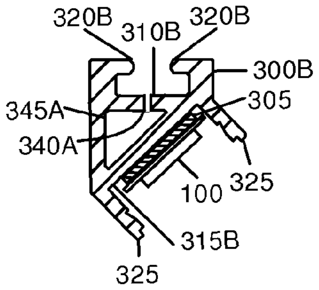
Fig. 6

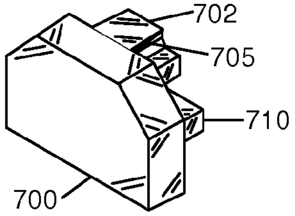
Fig. 7
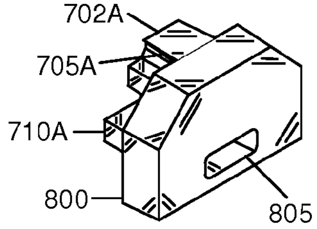
Fig. 8
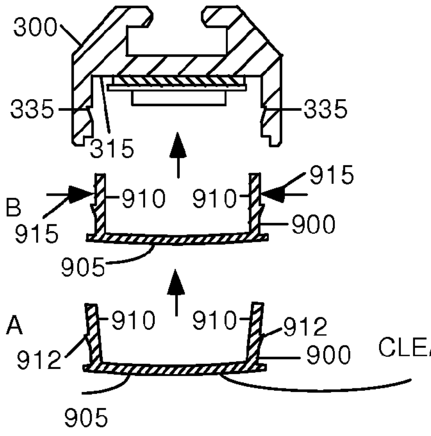
Fig. 9
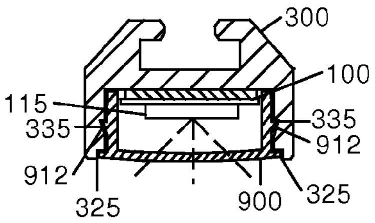
Fig. 10
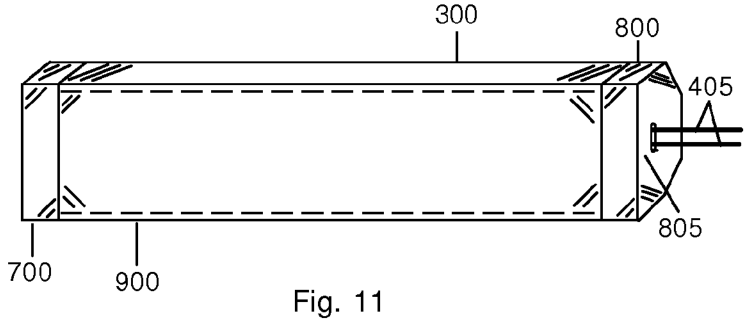
Fig. 11
Fig. 12A
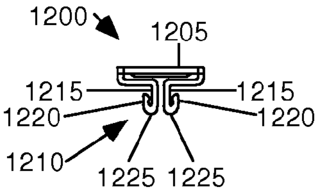
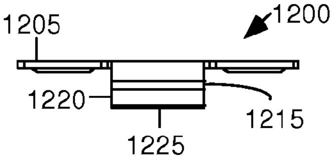
Fig. 12B
Fig. 12C
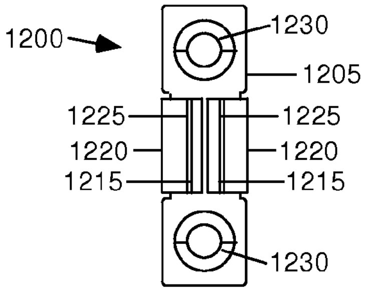

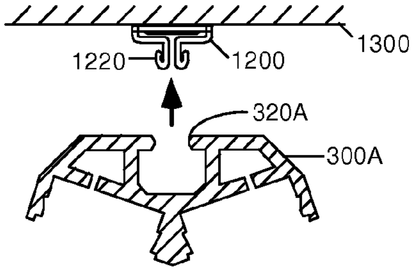
Fig. 13
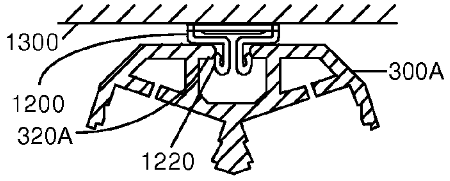
Fig. 14
Fig. 15A
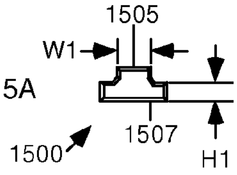
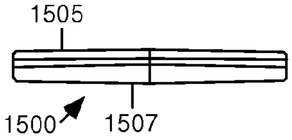
Fig. 15B
Fig. 15C
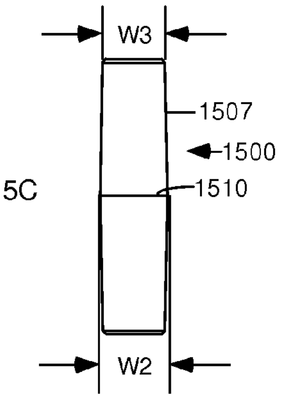
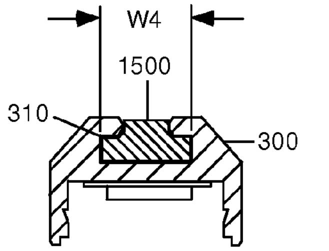
Fig. 16
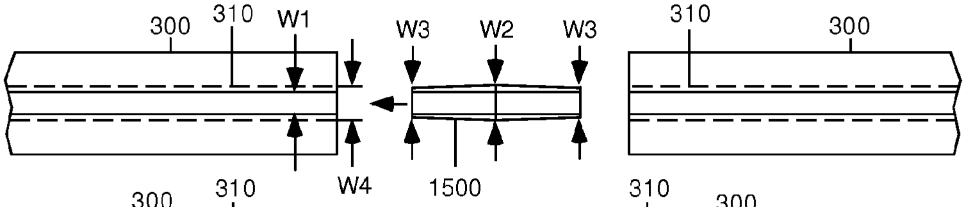
Fig. 17A
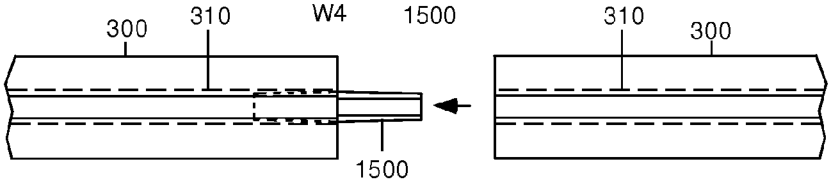
Fig. 17B
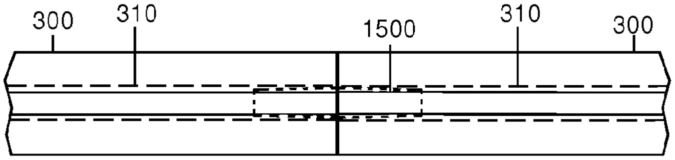
Fig. 17C

LED LINEAR LIGHTING STRIP

CROSS-REFERENCE TO RELATED APPLICATION

This application is related to copending application Ser. No. 13/967,017 of Russell Petersen et al., filed 2013 Aug. 14.

BACKGROUND

Prior Art

Light-emitting diode (LED) lighting systems are in common use today. They offer improved electrical efficiency when compared with incandescent and fluorescent lighting. Individual LED lights are relatively small, ranging in size from a fraction of one millimeter for a single LED to an array of of smaller LEDs that is a square centimeter or more. Such lights incorporate lenses, reflectors, phosphors, and diffusers that influence the size, shape, and appearance of light output.

Prior-art LEDs are often sold in groups formed into a strip configuration that can have any length. These are often seen as flexible strands of lights used in holiday decorations, advertising, and emergency lighting. Other arrangements include rigid or semi-rigid tracks that house printed circuit boards or tapes to which are affixed strips of LEDs. The tracks are secured to surfaces such as walls, the undersurface of kitchen cupboards, and the like. The tracks are available in various predetermined lengths, which can be joined end-to-end to form a continuous lighting arrangement of a desired length.

The following is a list of some possibly relevant prior art that shows the joining of LED light strips in order to form a lighting strip of predetermined length. Following this list I provide a discussion of these references.

| Pat. or Pub. Nr. | Kind Code | Issue or Pub. Date | Patentee or Applicant |
|---|---|---|---|
| U.S. Pat. No. 4,994,944 | B1 | 1991 Feb. 19 | Vernondier |
| U.S. Pat. No. 7,033,060 | B2 | 2006 Apr. 25 | Dubuc |
| U.S. 2010/0271804 | A1 | 2010 Oct. 28 | Levine |
| U.S. 2011/0007503 | A1 | 2011 Jan. 13 | Caron et al. |
| U.S. 2011/0286207 | A1 | 2011 Nov. 24 | Chan et al. |
| U.S. 2012/0002046 | A1 | 2012 Jan. 05 | Leadford et al. |
| U.S. 2013/0094225 | A1 | 2013 Apr. 18 | Leichner |

Vernondier shows variations on an extruded housing for a light strip. The housing comprises a base portion that houses a light strip and a translucent cover that removably snaps into the base portion by springably urging projections 20 and 21 past projections 15 and 16. He also goes into detail about the electrical connections of the strips and between strips. His strips are joined with a gasket into which the ends of two strips are inserted.

Dubuc shows a light strip for supplementing natural light in a greenhouse. A narrow attachment rail is used to suspend a strip of LEDs from the frame structure of the greenhouse. Strips of LEDs are mounted in a support rail ("carrier") made of extruded aluminum. The carrier has a base, a channel for receiving the light strip, and at least two pair of external ribs that define at least one mounting slot.

Levine shows a modular lighting device kit that includes first and second elongated light-source modules that contain LEDs. One or more clips hold the light-source modules in place a predetermined distance from a mounting surface. The modules can be rotated 360-degrees in the mounting clips.

Caron shows a valence lighting fixture that can be daisy-chained. The fixture comprises an elongated housing member and has a substantially square-shaped cross-section with up to three translucent sides from which light emanates. A mounting bracket removably snaps into a mounting groove for securing the fixture to a surface.

Chan shows a linear LED light module that interfaces with other modules to provide a substantially continuous array of LEDs. The LED strips are held against a mounting plate by a plurality of spring clips that engage the strips. Another spring clip mounting method is shown in in which the clips reach downward from the top of the strip. An alternative rod mount permits mounting the strip on a rod so that it can be rotated to allow for adjustment of the light output at different angles.

Leadford shows a slidable luminaire connector. One or more rails contain a plurality of LEDs (or other light source). One or more rails slidably engages a node that provides power and operating signals for the LEDs.

Leichner shows a modular, sectional linear LED lighting system that comprises a linear arrangement that is hung by a variety of means—hung from a cord,—rigidly attached to a surface, and hung from an aircraft cable. A surface mounting attachment slidably engages a mating T-slot on the body and then engages a bracket that is mounted to a surface. Sections are joined by brackets that "align the vertical and horizontal axis of the end-to-end connection as well as pull the extrusions tightly together.

While the above prior-art contains lighting strips of various kinds, all require seams or are not removable from their mounting surface.

SUMMARY

We have discovered a method and apparatus for joining and mounting a plurality of contiguously arranged linear LED light strips. A plurality of mounting clips are attached to a surface and a plurality of LED light strips are springably secured to the mounting clips. A wedge-shaped extrusion connector inserted into neighboring light strips aligns sequentially placed light strips and provides rigidity to their installation, even across gaps in the mounting surface.

DRAWING FIGURES

FIGS. 1 and 2 are plan and end views, respectively, of one end of a prior-art PCB LED light strip.

FIG. 3 is a cross-sectional end view of a linear light fixture according to one aspect of an embodiment.

FIG. 4 is a plan view of the fixture of FIG. 3.

FIGS. 5 and 6 show alternative cross-sectional end views of the fixture of FIGS. 3 and 4.

FIGS. 7 through 10 show perspective and cross-sectional views of additional components used in one embodiment.

FIG. 11 shows a perspective view of a finished light kit according to one aspect of an embodiment.

FIGS. 12A through 12C show end, side, and bottom views of a mounting clip for use with the embodiments of FIGS. 3 through 11.

FIGS. 13 and 14 show cross-sectional end views of the mounting of an embodiment of a LED linear lighting kit.

FIGS. 15A through 15C show end, side, and bottom views, respectively, of a dual-tapered wedge used to join two lighting fixtures.

FIG. 16 is a cross-sectional end view of the wedge of FIG. 15 installed in a light kit extrusion.

FIGS. 17A through 17C show the aligning and end-to-end butt-joining of two lighting fixture extrusions.

REFERENCE NUMERALS

| | | | |
|---|---|---|---|
| 100 | Prior art PCB LED light strip | 105 | Light strip board |
| 110 | Conductor | 115 | LED assembly |
| 120 | Light-emitting portion | 125 | Connection |
| 300 | Extrusion | 305 | Adhesive |
| 310 | Channel | 315 | Channel |
| 320 | Ledge | 325 | Side |
| 330 | Lip | 335 | Groove |
| 340 | Gap | 345 | Channel |
| 400 | Solder joint | 405 | Wire |
| 700 | Cap | 702 | First portion |
| 705 | Thickened portion | 710 | Second portion |
| 800 | Cap | 805 | Hole |
| 900 | Diffuser | 905 | Portion |
| 910 | Arm | 912 | Projection |
| 915 | Arrow | 1200 | Clip |
| 1205 | Base | 1210 | Member |
| 1215 | Main portion | 1220 | Auxiliary portion |
| 1225 | Bight | 1230 | Mounting Hole |
| 1300 | Mounting Surface | 1500 | Wedge |
| 1505 | Portion | 1507 | Portion |
| 1510 | Center point | | |

DESCRIPTION

Prior Art LEDs and Light Strips—FIGS. 1 and 2

FIGS. 1 and 2 show a plan and end views, respectively, of one end of a prior-art PCB (printed circuit board) LED light strip 100. Individual LED assemblies such as 115 are mounted on a light strip board 105 made of an insulating material, such as fiberglass, phenolic plastic, etc., that has printed conductors 110 thereon. Board 105 is either rigid or flexible. Conductors 110 extend down the length of strip 100, are typically made of copper, and are securely bonded to board 105 in well-known fashion.

Board 105 holds a row of LED assemblies 115, each having a central light-emitting portion 120 and at least two electrical connections 125. The LED assemblies are bonded to strip 100 using an adhesive compound (not shown) between the underneath surface of each assembly and board 105 and connections 125 are soldered to conductors 110 (FIG. 1), respectively, using well-known reflow soldering methods. The combination of the adhesive and solder bonds firmly secures the LED assemblies to board 105.

The semiconductor junctions that form the LEDs produce light when energized by a limited, direct-current potential source. Excessive currents or reverse potentials can cause failure of a device. Because of this, LED assemblies contain well-known current limiting circuitry, such as a resistor or current-limiting integrated circuit (not shown). If they are to be operated by an alternating current source, they also contain a rectifier (not shown) to prevent application of a reverse potential to the junction of the device.

The length of LED strip 100 can be short and include from one LED assembly 115 to several, or it can be very long and include many LED assemblies 115. In some applications a plurality of strips 100 are joined together, end-to-end. In all applications, it is necessary to apply electrical power to strip 100 in order to energize it. In many applications, this is done by soldering wires to conductors 110.

DESCRIPTION

First Embodiment—FIGS. 1 through 12C

FIGS. 3 through 12C show the elements of a linear LED lighting kit according to one aspect of a first embodiment. A linear LED lighting kit includes all components necessary to assemble a finished light fixture that is attachable to a surface. Such kits are found in under-cabinet lighting in kitchens, in display cases, in accent and emergency lighting for rooms, and the like.

Fixture.

FIG. 3 is a cross-sectional end view of an extrusion 300 comprising first and second open channels 310 and 315, respectively. Channel 310 is bounded by a pair of ledges 320 and channel 315 is bounded by a pair of sides 325. A light strip 100 is secured within channel 315 by a layer of adhesive 305. Sides 325 further include inner lips 330 and grooves 335 that are used in securing a light diffuser or lens, as described below.

FIG. 4 is a top view of extrusion 300 as it is shown in FIG. 3. A pair of solder joints 400 secure and electrically connect a pair of insulated wires 405 to electrical conductors 110 of strip 100. Wires 405 are then connected to a source of power when strip 100 is to be energized.

FIGS. 5 and 6 show alternative versions of extrusion 300 that are used when light is to be directed at various angles with respect to the plane of a mounting surface (shown below). FIG. 5 shows a design that directs light from LED strips 100 and 100A at two angles with respect to a mounting surface. Extrusion 300A includes a first open channel 310A, similar to open channel 310 in extrusion 300 (FIG. 3) and two open channels 315A and 315AA that face in a direction generally opposite that of channel 310A. Extrusion 300A further includes sides 325, lips 330, and notches 335, similar to those shown in FIG. 3. At the center of extrusion 300A, two lips 325 are joined into a single lip 325A. LED strips 100 and adhesives 305 are the same as shown in FIG. 3.

FIG. 6 shows another alternative extrusion 300B with channels 310B and 315B, LED strip 100 and adhesive 305, similar to those shown in FIGS. 3 and 5. FIGS. 5 and 6 show gaps 340 and 340A, respectively, in extrusions 300A and 300B. These gaps are used in the extrusion process for the formation of channels 345 and 345A, respectively. Many variations of extrusions 300 are possible.

Channels 310 are shown as having different depths in FIGS. 3, 5, and 6. The depths of these channels are not critical as long as they are able to accommodate members 1210 of mounting clip 1200, as discussed below (FIGS. 12A-12C). The spacing between lips 325 is determined by the combined width and spacing of members 1210 of mounting clip 1200, as shown below.

Extrusions 300 are made of aluminum, although they can be plastic, another metal such as brass, hard rubber, or another substance that is extrudable and forms a rigid structure. Channels 315 are 1.5 cm wide, although other widths can be used. The relative sizes of the remaining portions of extrusions 300 are scaled approximately as indicated in the drawings. Extrusions 300 vary in length from about 5 cm to one meter or more, depending on the requirements of any particular installation. Adhesive 305 is two-sided tape, although a liquid adhesive that forms a bond between channel 315 and the back side of strip 100 can be used.

FIGS. 7 through 10 show additional components used in the linear LED lighting kit. FIGS. 7 and 8 are perspective views of end caps 700 and 800, respectively without and with a hole 805. Caps 700 and 800 provide closures for covering the ends of extrusions 300. Caps 700 and 800 include first wedge-shaped or tapered portions 702 and 702A, respectively, which have gradually thickened, tapered portions 705 and 705A, respectively. The first tapered portions 702 and 702A are slidably inserted into channel 310 of extrusion 300. Second portions 710 and 710A, respectively, are slidably inserted into channel 315 of extrusion 300 at the same time. As end caps 700 and 800 are urged into channels 310 and 315, thickened portions 705 wedge against ledges 320 of extrusion 300 (FIG. 3), while portions 710 prevent misalignment or rotation of end caps 700 and 800 around portions 710, thereby firmly securing end caps 700 and 800 in place on extrusion 300. Wires 405 (FIGS. 4 and 11) are connected to conductors 110 of light strip 100 by solder joints 400, passed through hole 805, and connected to a power source (not shown) for energizing light strip 100.

FIGS. 9 and 10 are cross-sectional end views of extrusion 300 and a lens or diffuser (diffuser) 900. Diffuser 900 has a light-emitting portion 905 and two arms 910 that are tilted away from each other, as shown at position A, by between 1 and 5 degrees, although other angles can be used. Arms 910 further contain two outward-facing projections. Diffuser 900 is slightly flexible, allowing fingers 910 to be pinched together as indicated by horizontal arrows 915 when diffuser 900 is at position B. When the diffuser is to be installed in extrusion 300, fingers 910 are pinched together and diffuser 900 is slidably inserted into channel 315 of extrusion 300.

FIG. 10 shows diffuser 900 in place in extrusion 300. Projections 912 are springably held in notches 335 and the edges of surface 905 rest in grooves 325 of extrusion 300. Dashed lines indicate the passage of light from LED assembly 115 outward through diffuser 900 when light strip 100 is energized. Diffuser 900 is made of polycarbonate, acrylic, or another plastic or glass. It is clear or translucent and its surface can be plain or lenticular (having lenticles). It can have a lens shape or comprise other light-guiding means such as a privacy filter manufactured by Minnesota Mining and Manufacturing Co., of Minneapolis, Minn. and sold under the trademark "3M Privacy Filters". The lens or other light guiding means can be formed into the diffuser's surface in order to direct light from LED assembly over a predetermined area at a predetermined distance from the diffuser. The diffuser can also be made in colors.

FIG. 11 shows a finished light kit according to one aspect of the present embodiment. End caps 700 and 800 and diffuser 900 are installed in extrusion 300. Wires 405 are passed through hole 805 and ready for connection to a power source.

Mounting Clip.

FIGS. 12A through 12C, respectively, show end, side, and bottom views of a mounting clip 1200 that is used with extrusions 300. Mounting clip 1200 comprises a flat base portion 1205, a pair of flexible members 1210 having a main portion 1215 extending downward from base portion 1205, and an auxiliary portion 1220 that extends upward and generally parallel to main portion 1215. Main portion 1215 and auxiliary portion 1220 are joined by a bight portion 1225. Flat base portion 1205 includes at least one hole 1230 through which a fastener (not shown) is passed when clip 1200 is secured to a mounting surface.

Clip 1200 is made of a metal such as steel, brass, or bronze, or a strong plastic material such as reinforced nylon. Flexible members 1210 are sized to be slidably inserted or urged into channel 310 of extrusion 300. The dimensions of the remainder of clip 1200 scales accordingly.

OPERATION

Installation: Attaching LED Linear Lighting Kit to Surface—FIGS. 13-17C

FIGS. 13 and 14 show emplacement of the LED linear light kit according to one aspect of the present embodiment. FIGS. 13 and 14 show a cross-sectional view of an extrusion 300A in the present example. In some cases extrusion 300 is installed on a clip 1200, followed by installation of a light strip 100, wires 405, and end caps 700 and 800. In other cases a completed light fixture such as shown in FIG. 11 is installed. In both cases, the attachment of extrusion 300 to clip 1200 is done in the same way. Other extrusions, such as 300 and 300B, can be used, as well as any others that have an open channel 310 of a predetermined depth and spacing between ledges 320.

FIG. 13 shows a mounting surface 1300 such as a ceiling, wall, or the underside of a cabinet to which a clip 1200 has been secured by fasteners, tape, glue, or other means (not shown). An extrusion 300A is positioned beneath clip 1200 and urged upward as indicated by the arrow at the center of FIG. 13. Ledges 320A engage auxiliary portions 1220 of clip 1200, springably squeezing portions 1200 together as extrusion 300A moves upward.

FIG. 14 shows extrusion 300A fully installed on clip 1200. Auxiliary portions 1220 of clip 1200 are springably urged outward against ledges 320A, thereby firmly securing extrusion 300A to clip 1200. For very short LED lighting kit fixtures, on the order of 10 cm long, a single clip 1200 suffices. For longer fixtures, a plurality of clips 1200 is used.

Joining of Two LED Lighting Kits that are Arranged End-to-End.

FIGS. 15 through 17C show how two lighting kits are joined with their butted ends aligned.

FIGS. 15A through 15C show end, side, and bottom views, respectively, of a double-tapered wedge 1500 that is used to join two lighting kits end-to-end. Wedge 1500 has a top portion 1505 of width W1 that is sized to slidably insert between ledges 320 in any of extrusions 300. Wedge 1500 has a bottom portion 1507 with height H1 that is sized to slidably fit in channel 310 of any of extrusions 300. Wedge 1500 is symmetric about a center point 1510 where the width of wedge 1500 is W2. At its ends, the width of wedge 1500 is W3. Width W3 is slightly less than the width W4 of channel 310 of extrusion 300 (FIG. 16). Width W2 is slightly larger, approximately 0.5 mm more, than width W4 of channel 310. Thus wedge 1500 can be slidably inserted half-way into channel 310, up to a point near center point 1510, but no more because it is stopped by interference between the two widths. Wedge 1500 is made of plastic, metal, or wood.

FIG. 16 is a cross-sectional view of wedge 1500 after insertion into channel 310 of extrusion 300.

FIGS. 17A through 17C show top views of two extrusions 300 in preparation for a butting assembly in order to form a light fixture of extended length. In FIG. 17A, wedge 1500 is positioned for slidable insertion into channel 310 of the left-hand extrusion 300. W3 is less than W4 so wedge 1500 can enter channel 310 of extrusion 300. However W2 at the mid-point of wedge 1500 is slightly greater than W4 so wedge 1500 cannot be inserted past the mid-point of wedge 1500.

FIG. 17B shows the left half of wedge 1500 inserted in channel 310 of the left-hand extrusion 300. Next, the right-hand extrusion 300 is urged leftward toward the left-hand extrusion 300. The two extrusions are aligned so that the right half of wedge 1500 will enter channel 310 of extrusion 300 as the two extrusions are urged together lengthwise.

FIG. 17C shows left-hand and right-hand extrusions 300 butted together, aligned by wedge 1500. The alignment of two extrusions results in a pleasing appearance when the extrusions are butted together.

Left-hand and right-hand extrusions 300 can be joined with wedge 1500 either before or after being secured to mounting surface 1300 (FIGS. 13 and 14). In the latter case, the two extrusions can be positioned with their ends to be joined separated by at least the length of wedge 1500. A first end of wedge 1500 is then inserted into a first extrusion and the two extrusions are slidably moved together as the second end of wedge 1500 is inserted into a second extrusion, while both extrusions remain mounted on clips 1200.

End caps 700 and 800 are not used at the butt joint, but can be used at the free ends (not shown in FIG. 17) of extrusions 300. A single LED strip 100 can be installed across the butt joint from one extrusion to the other with conductors 110 (FIG. 1) running continuously across the joint. Alternatively two of strips 100 can be used, one for each of extrusions 300, with wiring at the free ends of extrusions 300.

CONCLUSIONS, RAMIFICATIONS, AND SCOPE

The present method and apparatus serve to house, join, and mount one or a plurality of LED light strips in an LED lighting fixture kit. A fixture comprises an extrusion that contains an LED light strip. A fixture further includes a translucent diffuser that provides a decorative cover and also diffuses light emitted by LEDs in the LED strip. A tapered wedge aligns two fixtures that are butted together end-to-end. A mounting clip has a base portion and two fingers that are shaped to springably mate with a channel on one side of the extrusion. The mounting clip is secured to a mounting surface and the channel of the extrusion is springably urged against the clip until the fingers enter the channel, thereby removably installing the lighting fixture kit.

While the above description contains many specificities, these should not be construed as limitations on the scope, but as exemplifications of some present embodiments. Many other ramifications and variations are possible using the system and methods described. For example, instead of being straight, the extrusions can be curved either laterally or longitudinally in order to remain in contact with a non-flat mounting surface. A plurality of extrusions can be joined across a gap in a mounting surface, using at least one mounting clip on either side of the gap and a tapered wedge to align butted ends of the extrusions. Extrusions, diffusers, and LEDs can be supplied in a variety of colors. Thus the scope should be determined by the appended claims and their legal equivalents, rather than the examples and particulars given.

The invention claimed is:

1. A lighting kit, comprising:

a mounting clip for mounting said lighting kit to a mounting surface, said mounting clip including a base and a plurality of flat and flexible members having a main portion extending away from said base and in generally parallel relation;

each of said members having an auxiliary portion that extends toward said base and a bight portion connecting said main and said auxiliary portions;

an extrusion securable to said mounting clip, said extrusion including first and second channels;

an LED light strip secured within said first channel of said extrusion, said second channel of said extrusion having a recess with two overhanging ledges extending toward one-another at the entrance to said second channel and separated by a distance smaller than the maximum width of said auxiliary portions of said mounting clip so that said clip can be inserted into said recess and retained in said recess by said ledges engaging said auxiliary portions;

whereby when mounting said extrusion to said mounting surface, said flat and said flexible members and said auxiliary portions of said mounting clip engage said ledges on said recess, thereby providing a secure attachment of said lighting kit to said mounting surface;

a second extrusion similar to said first-named extrusion so as to provide first and second extrusions; and a double-tapered wedge having first and second ends, said wedge having a top portion with a first width that is sized to slidably insert between said ledges in said extrusions and a bottom portion with a height that is sized to slidably fit into said second channel of said extrusions and a width that is tapered from a narrow width at its ends to a wider width at its center point;

said width of said wedge at said center point between said first and said second ends being equal to or slightly greater than the width of said second channel so that said wedge is slidably insertable into said second channel up to the center point of said wedge but no further;

whereby when said first end of said wedge is inserted into said second channel of said first extrusion, said second end of said wedge extends outward from said first extrusion so that said second channel of said second extrusion can slidably engage said second end of said wedge until said first and said second extrusions are butted together in a tight fit, thereby securing said first and said second extrusions in alignment.

2. The lighting kit of claim 1, further including at least one end cap, said end cap further including first and second portions that are parallel to one-another and extend outward from one side of said end cap, said first portion having a tapered portion so that when said tapered portion is inserted into said first channel of said extrusion, said tapered portion wedges against said ledges in said first channel of said extrusion, and when said second portion is slidably inserted into said second channel of said extrusion while said first portion is inserted into said first channel of said extrusion; and said second portion prevents misalignment or rotation of said end cap when said end cap is installed on said extrusion, thereby further securing said end cap in said extrusion;

whereby when said first and said second portions of said end cap are urged into said first and said second channels of said extrusion said end cap is secured to one of said ends of said extrusion.

3. The lighting kit of claim 2, wherein said end cap further includes a hole passing therethrough from a side opposite said first and said second portions of said end cap to the opposite side of said end cap, thereby permitting electrical wires to pass from outside said end cap to a point within said second channel of said extrusion so that electrical energy can be supplied to said lighting strip in said second channel of said extrusion.

4. The lighting kit of claim 1, further including a diffuser, said diffuser comprising a translucent portion and two arm portions, said arm portions being sized to springably fit into said second channel of said extrusion, thereby holding said diffuser in place in said extrusion;

whereby when said diffuser is installed in said second channel of said extrusion and said light strip is energized, light passes through said translucent portion of said diffuser.

5. A method for mounting a lighting kit to a mounting surface, comprising:

providing a mounting clip for mounting said lighting kit to a mounting surface, said mounting clip including a base and a plurality of flat and flexible members having a main portion extending away from said base and in generally parallel relation, each of said members having an auxiliary portion that extends toward said base and a bight portion connecting said main and said auxiliary portions;

providing an extrusion securable to said mounting clip, said extrusion including first and second channels;

providing an LED light strip secured within said first channel of said extrusion;

said second channel of said extrusion having a recess with two overhanging ledges extending toward one-another at the entrance to said second channel and separated by a distance smaller than the maximum width of said auxiliary portions of said mounting clip so that said clip can be inserted into said recess and retained in said recess by said ledges engaging said auxiliary portions;

securing said mounting clip to said mounting surface;

urging said second channel of said extrusion to engage said mounting clip, whereby when said mounting clip is secured to said mounting surface and said second channel of said extrusion engages said mounting clip, said lighting kit is mounted to said surface; and connecting the extrusion to a similar second, adjacent extrusion by tightly fitting a double-tapered wedge between said extrusion and said second extrusion.

6. The method of claim 5, further including:

providing at least one end cap wherein said end cap further includes first and second portions that are parallel to one-another and extend outward from one side of said end cap, said first portion having a tapered portion so that when said tapered portion is inserted into said first channel of said extrusion, said tapered portion wedges against said ledges in said first channel of said extrusion, and when said second portion is slidably inserted into said second channel of said extrusion while said first portion is inserted into said first channel of said extrusion, said second portion prevents misalignment or rotation of said end cap when said end cap is installed on said extrusion, thereby further securing said end cap in said extrusion; and inserting said first and second portions of said end cap into said first and second channels of said extrusion, thereby securing said end cap to said extrusion.

7. The method of claim 6, wherein at least one of said end caps further includes a hole, and the method further comprises:

providing wires for connecting said light strip to a power source; passing said wires through said hole; and connecting said wires to said light strip and said power source;

whereby when said power source is energized, said light strip is energized and provides light.

8. The method of claim 5, further including:

providing a diffuser for covering said light strip in said first channel of said extrusion;

said diffuser further including a light-emitting portion and two arms extending generally perpendicular to said light-emitting portion;

springably squeezing said arms of said diffuser together; and inserting said arms of said diffuser into said first channel of said extrusion and urging said arms fully into said first channel of said extrusion;

whereby when said arms of said diffuser are fully inserted into said first channel of said extrusion, said diffuser covers said light strip in said first channel of said extrusion.

9. The method of claim 8, wherein said light-emitting portion of said diffuser further includes a surface selected from the group consisting of clear, translucent, and lenticular surfaces.

10. The method of claim 8, wherein the material of said diffuser is selected from the group consisting of polycarbonate, acrylic, and glass.

11. The method of claim 5, wherein the material of said wedge is selected from the group consisting of plastic, metal, and wood.

12. The method of claim 5, wherein said wedge comprises:

a top portion with a first width that is sized to slidably insert between said ledges in said extrusions;

a bottom portion with a height that is sized to slidably fit into said second channel of said extrusions; and a width that is tapered from a narrow width at said first and second ends to a wider width at a center point thereof, said width of said wedge at said center point between said first and said second ends being equal to or slightly greater than the width of said second channel so that said wedge is slidably insertable into said second channel up to the center point of said wedge but no further.

13. A lighting kit, comprising:

an extrusion having first and second channels, an LED light strip secured within said first channel of said extrusion;

mounting means for securing said extrusion to a surface;

said mounting means comprising a base portion, a plurality of slightly separated flat and flexible members comprising a main portion that extends from said base portion, each of said members further including an auxiliary portion that extends toward said base and a bight portion connecting said main and said auxiliary portions, said members and said auxiliary portions being sized to slidably and springably enter said second channel of said extrusion and then springably rebound so that said mounting means is secured within said second channel of said extrusion, whereby when said extrusion is urged against said mounting means so that said flat and flexible members and said main and said auxiliary portions enter said second channel of said extrusion, said extrusion is secured to said surface;

a second extrusion identical in cross-section to said first extrusion; and a tapered wedge sized to be slidably insertable only half-way into said second channel of each of said first and said second extrusions to connect the extrusion and the second extrusion;

whereby when said wedge is inserted half-way into said second channel of said first extrusion and half-way into said second channel of said second extrusion, said extrusions are butted together and aligned in a tight fit.

14. The lighting kit of claim 13, further including end cap means for capping said extrusion, said end cap means further including a plurality of portions that are parallel to one-another and simultaneously insertable into said first and said second channels of said extrusion, thereby securing said end cap means in said extrusion.

15. The lighting kit of claim 14, wherein said end cap means further includes a hole arranged to admit a wire for connecting said light strip to a power source.

16. The lighting kit of claim 13, wherein said tapered wedge is made of materials selected from the group consisting of wood, metal, and plastic.

17. The lighting kit of claim 13, further including diffuser means for diffusing light emitted by said light strip when said light strip is energized, said diffuser means being springably and slidably insertable into said first channel of said extrusion.

18. The lighting kit of claim 17, wherein said diffuser means is made of a material selected from the group consisting of polycarbonate plastic, acrylic plastic, and glass.

* * * * *